United States Patent [19]

Thorsrud et al.

[11] 4,234,636

[45] Nov. 18, 1980

[54] THERMOPLASTIC ELASTOMERIC COMPOSITION, PRODUCT AND METHOD OF MANUFACTURE

[75] Inventors: Agmund K. Thorsrud, Bath; Roy W. Siedenstrang, Akron, both of Ohio

[73] Assignee: Phillips Petroleum Company, Bartlesville, Okla.

[21] Appl. No.: 973,978

[22] Filed: Dec. 28, 1978

[51] Int. Cl.³ .................. B32B 7/10; B32B 25/04; B32B 27/04

[52] U.S. Cl. .................. 428/95; 204/159.12; 204/159.17; 204/159.2; 260/17.4 R; 260/17.4 BB; 260/42.47; 264/26; 428/290

[58] Field of Search ............. 264/26; 260/17.4 R; 204/159.12

[56] References Cited

U.S. PATENT DOCUMENTS

| | | | |
|---|---|---|---|
| 3,639,190 | 2/1972 | Brooke et al. | 264/26 |
| 3,888,810 | 6/1975 | Shinomura | 260/17.4 BB |
| 3,937,774 | 2/1976 | Wiley et al. | 264/26 |
| 3,985,702 | 10/1976 | Himes | 260/33.6 AQ |
| 4,100,311 | 7/1978 | Nablo et al. | 428/95 |
| 4,118,353 | 10/1978 | Makowski et al. | 260/42.47 |
| 4,153,589 | 5/1979 | Triolo | 260/42.47 |
| 4,172,917 | 10/1979 | Angelle et al. | 428/95 |

FOREIGN PATENT DOCUMENTS 189545  3/1964  Sweden .................. 264/122

*Primary Examiner*—Edward M. Woodberry

[57] ABSTRACT

An unvulcanized, moldable composition comprising 100 parts by weight of a thermoplastic elastomer, at least about 10 parts by weight of an extender oil per 100 parts by weight of the thermoplastic elastomer and at least about 20 parts by weight of a solid, hygroscopic filler, having greater than 1 percent by weight of absorbed water and capable of retaining a substantial portion of such water at temperatures of at least 100° C., per 100 parts by weight of the thermoplastic elastomer, the ratio of the oil to the hygroscopic filler being from about 0.3 to about 3. A method of flow molding by exposure to microwave energy while applying pressures below about 200 psi and a molded article of manufacture are also described.

56 Claims, No Drawings

THERMOPLASTIC ELASTOMERIC COMPOSITION, PRODUCT AND METHOD OF MANUFACTURE

BACKGROUND OF THE INVENTION

Rubbers and elastomers of either natural or synthetic origin generally require vulcanization in order to obtain useful elastomeric properties. Before vulcanization, rubbers possess tacky properties and low strength, which make them of little utility except as rubber cements. The optimum elastomeric properties are not attained until the rubber has been subjected to a vulcanization treatment such as by means of heating with sulfur, sulfur compounds, peroxides, or other means. By contrast, thermoplastic elastomers in their "green" or unvulcanized state have been developed which can be utilized to make a wide variety of materials and articles having almost any desired properties. Consequently, such thermoplastic elastomers can be readily molded into useful articles, thereby saving the time and expense of vulcanization as well as retaining numerous properties which are not possessed by vulcanized rubbers or elastomers. A particularly useful group of such thermoplastic elastomers are conjugated diene/vinyl aromatic block copolymers.

It has been known in the past to extend thermoplastic elastomers with petroleum base oils such as naphthenic, aromatic and paraffinic oils in order to reduce costs and to improve the elastomeric properties of certain of the thermoplastic elastomers. Further, it has also been known to add fillers or bodying agents to thermoplastic elastomers in order to reduce the cost of the material and to add bulk and strength to the same. While a vast number of fillers have been suggested in general terms for use in thermoplastic elastomers, there is, in fact, a limited number of such materials which have been successfully used and which are used almost universally. For example, fillers have generally been confined to silicas, carbon blacks, numerous varieties of china clay and whiting or calcium carbonate. However, it has been found that these so-called conventional fillers have a tendency to harden thermoplastic elastomers and limit their uses in articles where flexibility and elasticity are desirable. This is particularly true when large amounts of such fillers are employed. Likewise, the use of excessive amounts of extender oils results in a product which has a tendency to bleed or exude a certain amount of the oil. While the latter is a desirable characteristic in certain uses, in other instances it is highly undesirable.

There are also many methods of forming or molding thermoplastic elastomers such as injection or compression molding, vacuum forming and flow molding, and for applying a coating or sheet of thermoplastic elastomer to woven or non-woven textiles or other substrates, such as calendering or spreading the elastomer on the substrate as a hot melt. These known processes have one or more undesirable features such as requiring extreme pressures, being time-consuming, producing products of poor quality such as poor tear resistance in laminated objects and, in general, undue multiplication of the number of steps required to produce the final product. Because of the reduced pressures required and the reduction in the processing steps necessary, flow molding is an attractive means of forming certain varieties of articles. In a flow molding process, the moldable material in powder, pellet or particle form, or in the form of a sheet is placed in a suitable mold, the mold is closed and the moldable composition heated to a temperature just sufficient to melt and cause flow of the moldable material into the interstices of the mold. Recently, a particularly attractive technique of flow molding has been suggested. In accordance with this procedure the usual flow molding process is carried out except that rather than using radiant heat to melt and cause flow of the moldable material, microwave energy is utilized. Heating with microwave energy has the obvious advantage of substantially shortening the processing time but, in addition, prevents the deleterious effects which often result from heating for extended periods of time.

It would, therefore, be desirable to provide a moldable thermoplastic elastomer composition which retains its property of good flexibility, to provide an article of manufacture having this desirable property and particularly to be able to utilize the above-described, simplified microwave flow molding technique.

It is therefore an object of the present invention to overcome the above-mentioned shortcomings of the prior art.

Another object of the present invention is to provide an improved unvulcanized, moldable composition, a simplified method of molding and an improved molded product.

Another object of the present invention is to provide an improved unvulcanized, moldable composition including a conjugated diene/vinyl aromatic block copolymer.

Another and further object of the present invention is to provide an improved flow molding technique which utilizes microwave energy as a heat source.

Yet another object of the present invention is to provide an unvulcanized, molded article of manufacture having improved flexibility.

Another object of the present invention is to provide an improved unvulcanized, moldable thermoplastic elastomer composition containing a filler material and an extender oil, an improved technique for molding such composition and an improved article of manufacture resulting therefrom.

A further object of the present invention is to provide an improved unvulcanized, modable thermoplastic elastomer composition containing large amounts of filler and extender oil, a simplified technique for molding such composition and an improved article of manufacture produced thereby.

The above and other objects and advantages of the present invention will be apparent from the following detailed description.

SUMMARY OF THE INVENTION

In accordance with the present invention, it has been found that an improved unvulcanized, moldable composition can be prepared by mixing 100 parts by weight of a thermoplastic elastomer, at least about 20 parts by weight of an extender oil per 100 parts by weight of the thermoplastic elastomer and at least about 10 parts by weight of a solid, hygroscopic filler, having greater than 1 percent by weight of absorbed water and capable of retaining a substantial portion of such water at temperatures of at least 100° C., per 100 parts by weight of the thermoplastic elastomer, the ratio of the oil to the hygroscopic filler being from about 0.3 to about 3. It has also been found in accordance with the present invention that an improved unvulcanized, molded article of manufacture can be produced from the above composition, particularly a fabric substrate having said composition bonded thereto. It has further been found, in accordance with the present invention, that the above-mentioned unvulcanized, moldable composition can be simply and effectively molded by disposing the composition in a suitable mold and heating the composition by the application of microwave energy thereto while applying a pressure below about 200 psi for a time just sufficient to melt the composition and cause flow of the same into the interstices of the mold.

The above objects of the present invention and the nature of the present invention will be clear from the following description of the preferred embodiments.

DETAILED DESCRIPTION OF THE INVENTION

The thermoplastic elastomers useful in practicing the present invention are normally solid, block copolymers, characteristicly exhibiting high tensile strength and elongation in their natural condition, that is, in their green or unvulcanized state. Particularly useful are linear block or radial teleblock copolymers. More specifically, useful elastomers are radial teleblock copolymers of butadiene/styrene. Such copolymers are described in more detail in U.S. Pat. Nos. 3,823,109; 3,826,776 and 3,959,545. These polymers are prepared by methods well known in the art.

The butadiene/styrene copolymers, discussed above, generally contain about 50 to 90 weight percent butadiene and from 50 to about 10 weight percent of styrene; preferably, from about 50 to 70 weight percent butadiene and about 50 to about 30 weight percent styrene. Copolymers particularly useful in producing compositions in accordance with the present invention are those having from about 60 to about 70 weight percent butadiene. When less than about 10 percent styrene is employed, the resulting copolymers do not possess the requisite green tensile strength. On the other hand, more than 50 weight percent of the styrene in the copolymer results in a composition in which hardness is increased at the expense of elasticity. Useful copolymers will generally exhibit a weight average molecular weight in the range of from about 75,000 to about 500,000 but a range of about 100,000 to about 350,000 is preferable.

It is also within the scope of the present invention to add other polymers to the thermoplastic elastomer in amounts up to about 150 parts by weight of the polymer per 100 parts by weight of the elastomer. Such additional polymers are generally solid resinous polymers of a vinyl-substituted aromatic compound, for example, styrene, alphamethyl styrene, etc., alone or copolymerized with a monomer such as acrylonitrile or a conjugated diene such as butadiene. Such homopolymers and copolymers generally have densities in the range of about 1.04 to about 1.10 gram/cc (ASTM D 792), a tensile strength in the range of from about 5,000 to about 12,000 psi (34.5-82.7 MPa), ASTM D-638, and a Shore A hardness ranging from about 35 to about 95 (ASTM D-2240) at about 23° C.

The previously mentioned thermoplastic elastomers may also have certain amounts of the extender oil incorporated therein during their manufacture. For example, the elastomers may have incorporated therein from 50 to 60 parts by weight of oil. Consequently, the amounts of added extender oil referred to herein, and specifically in the examples, are amounts in addition to the amounts incorporated in the thermoplastic elastomer during its manufacture and the amounts of elastomer referred to include the weight of the elastomer including the oil added during elastomer preparation. Suitable extender oils include those well known in the art such as naphthenic, aromatic and paraffinic petroleum oils, particularly the naphthenic type.

In accordance with the present invention, the thermoplastic elastomer composition of the present invention may have added thereto at least about 10 parts by weight of extender oil per 100 parts by weight of the thermoplastic elastomer. Preferred amounts of added extender oil include from about 70 to about 350 parts of oil per 100 parts of thermoplastic elastomer and ideally about 250 to about 300 parts of oil per 100 parts of thermoplastic elastomer.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris(nonylphenyl) phosphite, 2,6-di-t-butyl-4-methylphenol and the like. Exemplary conventional fillers and pigments include silica, carbon black, titanium dioxide, iron oxide and the like. Polypropylene and polystyrene are examples of thermoplastic resins which function as reinforcing agents. A butadiene/acrylonitrile elastomer is an example of an elastomer which functions as a processing aid.

In addition to the above conventional ingredients, it has been found, in accordance with the present invention, that an unvulcanized, moldable composition of a thermoplastic elastomer can be produced by adding thereto a solid, hygroscopic filler, having greater than 1 percent by weight, and preferably greater than 4.0 percent by weight, of absorbed water and capable of retaining a substantial portion of such water at temperatures of at least 100° C., such as, bentonite clay, particularly the Western type, wood flour, ground cork, etc., in addition to the usual amounts of the more conventional fillers and pigments. The hygroscopic filler may be utilized in amounts in excess of about 45 parts by weight of filler per 100 parts of thermoplastic elastomer (phr). These amounts do not include the usual amounts of conventional fillers and pigments which can be used. Preferably, the hygroscopic filler is utilized in amounts between about 350 and about 500 parts by weight of filler per 100 parts by weight of thermoplastic elastomer and ideally about 400 parts filler per 100 parts thermoplastic elastomer. It has also been found, in accordance with the present invention, that superior products can be produced by employing a particular range of extender oil/hygroscopic filler. Specifically, the desired weight ratios of oil to hygroscopic filler are 0.3 to 3, preferably 0.5 to 1.0 and ideally about 0.75.

The thermoplastic elastomer compositions of the present invention may be prepared by any means well known in the art for combining such ingredients, such as solution blending, milling, internal batch mixing, or continuous extrusion of a solid form of elastomer and the other ingredients. A rapid and convenient method of preparation comprises heating a mixture of the components to a temperature of about 120° C. to about 205° C., while separate specific embodiments preferably involve stirring a mixture of the components at about 160° C. to about 205° C., preferably about 175° C. to about 205° C. or by heating the mixture without stirring in a temperature range of about 125° C. to about 200° C., preferably about 125° C. to about 165° C. Preferably, the hygroscopic filler is capable of retaining a substantial portion of its absorbed water at temperatures above the melt temperature of the composition (usually about 160° C.) and up to the highest temperature utilized in the preparation of the composition prior to molding.

One method of preparing a composition comprising a conjugated diene/-vinyl aromatic block copolymer and extender oil involves placing a mixture of the copolymer and extender oil in suitable container such as a flat metal pan and heating said mixture, such as in an oven, without agitation at a temperature which normally falls within the range corresponding to about the melting point of the elastomer, about 120° C., up to about the flash point of the oil, about 200° C. Normally and preferably, heating is conducted within the range of about 125° C. to about 165° C. The composition can be formed of the mixture within a time of several seconds to several hours but the mixture is normally maintained at this temperature for about 15 minutes to several hours. The time required is dependent upon such things as the type of the elastomer and oil employed, the temperature used and the physical size of the particles of elastomer to be used in preparation of the composition. Furthermore, the time required to make a homogeneous mixture can normally be reduced by physically mixing the rubber and the oil prior to the heating step. Additional additives and formulations can be added to the elastomer-oil blend prior to or during the heating step. After the heating step, the composition is normally cooled prior to use in fabricating articles.

The composition can be further treated if desired or required in any conventional mixer such as a Banbury mixer or roll mill, particularly if small amounts of undissolved elastomer remain after the oven heating step or if it is desirable to add other ingredients prior to or during the heating step and such have not been uniformly distributed. The additional treatment, if desired, is normally conducted within the temperature range of about 75° C. to about 125° C., preferably maintaining the composition below its melting point for a few minutes up to several hours, preferably 3 to 15 minutes. A particularly useful technique is to add the hygroscopic filler in the beginning of the mixing cycle in order to take maximum advantage of heating time and to prevent surface bleeding and overheating when forming the molded articles.

The resultant composition may be in the form of extruded pellets, cut dices, preferably as small as possible since smaller pellets provide short heating times and better flow when utilized in flow molding. Ground pellets may also be utilized. Where large area objects are to be made, such as in the manufacture of mats, the composition may be provided in sheet form in order to shorten the heating time and effect better flow during the molding operation.

It has been found, unexpectedly, in accordance with the present invention that by utilizing a solid, hygroscopic filler, as previously discussed, reduced time for incorporating extender oil, ease of incorporation and extremely good dispersion are attained. On the other hand, it was found that when using conventional fillers, such as calcium carbonate (whiting) or china clay, particularly at high levels, extremely long mixing times were required and, more importantly, the resultant products were very dry, brittle and completely unusable. Talc, particularly at high loadings, also resulted in unexpectably long mixing times and may produce unacceptably stiff and boardy products. By comparison, products formed from the composition containing the hygroscopic fillers exhibited very good rubberiness and other physical properties.

It has also been found, in accordance with the present invention, that the composition containing hygroscopic fillers responded much better to microwave energy heating than materials filled with calcium carbonate, Dixie clays, talc, etc. The mixing difficulties with the china-type clay included excessive stickiness in the mixer which made it impossible to conventionally dump the mixed product.

It has also been found, in accordance with the present invention, that mixtures in accordance with the present invention respond unexpectedly to heating by microwave energy. It is known that the thermoplastic elastomers, in accordance with the present invention, do not, in and of themselves, respond well to heating by microwave radiation. However, it has been discovered in accordance with the present invention that the response of the thermoplastic elastomers to microwave radiation is significantly improved by the addition of the hygroscopic fillers. While the present invention is not intended to be limited by any theory, it is believed that the presence and retention of significant amounts of absorbed water by the hygroscopic filler is responsible for such enhancement of the response of the composition to microwave radiation. Consequently, the hygroscopic filler should be capable of retaining a significant amount of its abosrbed water at temperatures above the boiling point of water, preferably above the melt temperature of the composition (usually about 160° C.) and up to the temperature utilized in the preparation of the composition for molding and ideally up to the highest temperature reached in the molding operation (generally between about 280° and about 450° F. [138°–268° C.]). If the absorbed water of the hygroscopic filler is driven off during preparation of the mixture for flow molding, the improved response to microwave radiation does not occur, and the advantages during flow molding and of the resultant product, set forth herein, are not attained. In any event, tests have shown that if the hygroscopic fillers are dried before compounding, the receptivity to microwave radiation is significantly reduced. In addition, if the water is driven off during flow molding surface pits and/or porosity in the product result from the evolution of steam. Hence, the compositions of the present invention containing the hygroscopic fillers, as defined, are not as sensitive to overheating as formulations containing nonhygroscopic fillers with significant amounts of absorbed water which will not be retained during flow molding. The abovementioned ability to enhance the response to microwave radiation is particularly noticeable at high concentrations of hygroscopic filler.

Undesirable evolution of steam can also be controlled by incorporating in the mixture appropriate amounts (about 5 to about 25 parts by weight and preferably 20 parts by weight) of a waterbinding agent like calcium oxide, preferably in the form of an oil dispersion.

By definition, the microwave region is that portion of the electromagnetic spectrum lying between the far infrared and the conventional radio frequency portion. While the microwave region is not bounded by definition it is commonly regarded as extending from 300,000 megacycles to 1,000 megacycles (1 mm to 30 cm in wavelength). In most areas of the world certain frequencies have been assigned for industrial uses of microwave energy. For example, in the United States the assigned frequencies are 915 and 2,450 megahertz (MHz), in Europe assigned frequencies are 896 and 2,450 megahertz and in Japan 40 to 50 megahertz. When a material capable of absorbing microwave energy, rather than reflecting the same or being transparent thereto, is treated with microwave energy, heat is produced as a result of the absorption of the microwaves.

While, as previously indicated, the compositions of this invention respond well to microwave energy, it is preferred that a polar composition be added as a sensitizer to further enhance the response to microwave energy. Not all polar compounds have been found effective in enhancing the microwave energy response of the compositions but there are a large number which have been found so effective. For example, a material selected from among simple and polymeric alkylene glycols and their mono- and dialkyl ethers, ethanol amines and isopropanol amines and their hydrocarbyl-substituted derivatives and mixtures thereof have been found particularly useful. Exemplary compounds include ethylene glycol, 1,2-propylene glycol, 1,3-butylene glycol, 1,4-butylene glycol, 1,6-hexylene glycol, diethylene glycol, triethylene glycol, dipropylene glycol, thiodiethylene glycol, etc., polyethylene glycols having average molecular weights ranging from about 200 to 6,000 (commercially available under the tradename "Carbowax" from Union Carbide Corp., New York, N.Y.) polypropylene glycols having average molecular weights from about 400 to about 2,000; mixed poly(ethylene)-poly(propylene) glycols having average molecular weights up to about 6,000 and containing from about 30 to about 90 weight percent ethylene oxide; the monomethyl, monoethyl, and monobutyl ethers of ethylene glycol, propylene glycol and diethylene glycol; the monomethyl and monoethyl ethers of triethylene glycols; the dimethyl and diethyl ethers of diethylene glycol, dipropylene glycol and trimethylene glycol; the alkanolamines and substituted alkanolamines based on ethanol and isopropanol such as mono, di- and tri- ethanol amine, mono-, di- and triisopropylamine, methylethanolamine, dibutylethanolamine, phenyldiethanolamine, di(2-ethylhexyl)ethanolamine, dimethylisopropanolamine, dibutylisopropanolamine, and the like; and mixtures thereof. Other polar compounds such as acrylonitrile/butadiene copolymers, acrylonitrile/-butadiene blends with homopolymers of polyvinyl chloride and styrene/acrylonitrile copolymers are also effective. Other materials suitable as polarizing agents include glyceryl diacetate; di(2-hydroxyethyl) dimethylhydantoin; ionomer resins, particularly with other polarizing agents and polyphenyleneoxidepolystyrene blends. Presently preferred compounds include diethylene glycol and triethenolamine and particularly mixtures thereof and mixtures thereof with polyethylene glycols.

The polar agent will generally be utilized in a range of from about 0.5 to about 20 parts by weight per 100 parts by weight of thermoplastic elastomer (phr) and preferably about 0.75 to about 10 parts by weight per 100 parts by weight of thermoplastic elastomer.

While it has been observed that some pitting and/or porosity results when utilizing polar sensitizers in the present process, this problem can be solved by avoiding overheating (unnecessarily long periods of exposure to microwave energy), reducing the amount of polar sensitizer employed and/or adding a waterbinding agent like calcium oxide, as previously indicated.

It has also been found, in accordance with the present invention, that the addition of ethylene/vinyl acetate copolymer provides an unexpectedly increased response to microwave energy. Specifically, it has been found that by adding about 25 to about 35 parts by weight, preferably about 30 parts by weight, of such polymer to 100 parts by weight of thermoplastic elastomer the time required for microwave heating can be reduced by about one-half.

One of the distinct advantages of flow molding, utilizing microwave energy as a heating source, is the fact that relatively inexpensive molds can be utilized. For example, molds made of cast liquid silicone compounds may be utilized due to the fact that heating is rapid and pressures below about 200 psi can be utilized.

The process of flow molding in accordance with the present invention is carried out simply by disposing the thermoplastic elastomer moldable composition in a suitable mold in pellet form, ground pellet form or sheet form, applying a release sheet such as Teflon on the top of the composition, closing the mold and exposing the closed mold to microwave energy while applying a pressure up to about 200 psi. A suitable microwave unit and one which has been utilized hereinafter in the specific examples is a KN unit, Model J, manufactured by Compo Industries, Inc., Waltham, Mass. When a sheet of the moldable thermoplastic composition is to be bonded to a woven or non-woven fabric, for example to form a carpeting mat, this is accomplished by placing the moldable composition in the bottom of the mold as previously mentioned, placing the fabric, cut to size, on top of the moldable composition, placing a release sheet on top of the fabric, closing the mold and subjecting the same to microwave energy and pressure as previously described.

The following specific examples illustrate the improved compositions, techniques of molding and articles of manufacture produced in accordance with the present invention.

EXAMPLE I

Two tests were conducted utilizing two different compositions comprising butadiene/styrene radial teleblock copolymers. A 6 inch by 6 inch sheet of the thermoplastic elastomer composition having a thickness of 0.170 inch was placed in a suitable mold. A carpeting of polyester was cut to the same lateral dimensions and placed on top of the sheet of thermoplastic elastomer. A release sheet was placed on top of the carpet and the mold closed. The specimen was then subjected to high frequency microwave energy from a Compo Industries, Inc. Model J microwave generator having a 10 kilowatt output. The microwave generator was set at 80 percent power. The following table sets forth the overall composition of the polymeric elastomer composition, the heating times necessary to attain various results and the physical appearance of the resultant backed carpeting.

TABLE I

|  | 1* | 2* |
|---|---|---|
| Butadiene/Styrene Radial Teleblock (70/30 Bd/St) | 100 | — |
| Butadiene/Styrene Radial Teleblock (60/40 Bd/St) | — | 100 |
| Polystyrene | 70 | 35 |
| Alphamethylstyrene Polymer | — | 35 |

TABLE I-continued

|  | 1* | 2* |
|---|---|---|
| Silica | 30 | 30 |
| Naphthenic Oil | 300 | 250 |
| Bentonite Clay (Western Type) | 400 | 350 |
| Zinc Stearate | 0.80 | 0.80 |
| Antioxidant[1] | 0.70 | 0.70 |
| Ethylene/Vinyl Acetate Copolymer[2] | 30 | — |
| Ethylene/Vinyl Acetate Copolymer[3] | — | 30 |
| Iron Oxide | 2 | 2 |
| Furnace Black, ASTM N-550 | 0.5 | 0.5 |
| Polyethylene Glycol, Molecular Weight About 540 | 3 | 3 |
| Triethanolamine | 6 | 6 |
|  | 943.00 | 843.00 |
| Good bond, but not rubber tear | 4 Sec. | 6 Sec. |
| Perfect bond with rubber tear | 5-6 Sec. | 7-10 Sec. |
| Too much penetration into carpet | 8 Sec. | 12 Sec. |

*Ingredients are in parts by weight per 100 parts by weight of the thermoplastic elastomer (phr).
[1] Argus Chemical Corp., Brooklyn, N.Y., Mark(R) 1589B.
[2] Melting point about 240° F. (115° C.).
[3] Melting point about 220° F. (104° C.).

EXAMPLE II

In another series of tests, yet another composition comprising a butadiene/styrene radial teleblock copolymer was utilized in two tests. In one test ethylene/vinyl acetate copolymer having a melting point of about 240° F. (115° C.) was added to the composition whereas in the other test this material was not employed. The same mold, microwave generator and test procedure was employed except that in this particular case the molding composition was placed in the bottom of the mold and the release sheet directly on top of the molding composition to thereby form a mat, such as an outdoor mat without carpeting adhered thereto. It is to be seen as a result of this test that the inclusion of ethylene/vinyl acetate copolymer reduced the minimum heating time to less than half of that required when the ethylene/vinyl acetate copolymer was not employed.

TABLE II

|  | Outdoor Mat Compound | |
|---|---|---|
|  | 3* | 4* |
| Butadiene/Styrene Radial Teleblock (60/40 Bd/St) | 100 | 100 |
| Polystyrene | 100 | 100 |
| Silica | 50 | 50 |
| Naphthenic oil | 250 | 250 |
| Bentonite Clay | 350 | 350 |
| Zinc Stearate | 0.8 | 0.8 |
| Antioxidant[1] | 1.0 | 1.0 |
| Red Iron Oxide | 2.0 | 2.0 |
| Carbon Black | 0.5 | 0.5 |
| Triethanolamine | 4 | 4 |
| Polyethylene glycol[2] | 3 | 3 |
| Ethylene/Vinylacetate Copolymer | — | 30 |
|  | 861.3 | 891.3 |

*Excepting thermoplastic elastomer all ingredients are in phr.
[1] N-isopropyl-N'-phenyl-p-phenylenediamine.
[2] Molecular weight of about 540.

EXAMPLE III

Another test was conducted utilizing a bentonite clay from another manufacturer. The composition tested and the results of this test are set forth in Table III below.

TABLE III

| Composition | 5* |
|---|---|
| Butadiene/Styrene Radial Teleblock[1] | 150 |
| Polystyrene | 75 |
| Silica | 50 |
| Bentonite Clay (350 mesh) | 300 |
| Naphthenic Oil | 250 |
| Int. Lubricant: Zinc Stearate | 5 |
| Ethylene/Vinylacetate Copolymer[2] | 25 |
| Stabilizers: |  |
| Nickel dibutyldithiocarbamate | 0.5 |
| Zinc dibutyldithiocarbamate | 0.5 |
| Antioxidant: Low Density Polyethylene[3] | 1.0 |
| Paraffin Wax | 3 |
| Dessicant[4] | 20 |
| Carbon Black | 5 |
| Sensitizers[5] | 16 |
|  | 901.0 |
| Specific Gravity | 1.29 |
| 300% Modulus | 160 |
| Tensile Strength | 200 |
| Elongation | 480 |
| Shore A Hardness | 43 |
| Melt Index, Condition E | 100+ |

*Parts by weight
[1] 60/40 Bd/St + 50 phr oil
[2] Melting point about 240° F. (115° C.)
[3] Density of 0.92 g/cc, melt index of 70 (ASTM D 1238-65, Condition E)
[4] 80 wt. % ground CaO in high flash process oil (Desi Cal, Basic Chemicals, Cleveland, Ohio)
[5] Polyethylene glycol (Molecular Wt. about 540) + triethanolamine in equal proportions.

It has also been found that ground cork is an effective hygroscopic filler for use in the present invention. Ground cork has the additional advantage of lowering the weight of the final product.

EXAMPLE IV

Table IV below shows another series of two tests in which the same bentonite clay as in Example III was utilized and a third test in which wood flour was substituted for part of the bentonite clay. In addition to the suitability of wood flour as a hygroscopic filler, runs 7 and 8 show that good results can be obtained in flow molding the compositions of the present invention without the addition of polar sensitizers and run 6, as compared with runs 7 and 8, shows that overheating should be avoided when polar sensitizers are added. While it has been found that wood flour is not as effective as bentonite clay, it does in fact function in the same capacity and is useful in accordance with the present invention.

TABLE IV

| Composition | 6* | 7* | 8* |
|---|---|---|---|
| Butadiene/Styrene Radial Teleblock[1] | 150. | 150. | 150. |
| High Density Polyethylene | 100. | 100. | 100. |
| Bentonite Clay (350 mesh) | 300. | 300. | 200. |
| Wood Flour (Douglas Fir) | — | — | 100. |
| Ethylene-Propylene-Diene Terpolymer Elastomer | 25. | 25. | 25. |
| Antioxidant-Low Density Polyethylene[2] | 1. | 1. | 1. |
| Antioxidant[3] | 1. | 1. | 1. |
| Heat Stabilizer-Zinc Dibutyldithio- |  |  |  |

TABLE IV-continued

| Composition | 6* | 7* | 8* |
|---|---|---|---|
| carbamate | 1. | 1. | 1. |
| Paraffin Wax | 2. | 2. | 2. |
| Dessicant: CaO dispersed in oil | 15. | 15. | 15. |
| Int. Lubricant: Zinc Stearate | 4. | 4. | 4. |
| Naphthenic Oil | 100. | 100. | 100. |
| $TiO_2$ (pigment) | 6. | 6. | 6. |
| Coumarone Resin | 10. | 10. | 10. |
| Sensitizers: | | | |
|   Triethanolamine | 4. | — | — |
|   Polyethylene Glycol[4] | 4. | — | — |
| H.F. Flow-Molded in Compo-Industries, Inc. Model J, 10 kw Machine, Output setting 78. | | | |
|   Time, Sec. | 5 | 5 | 5 |
| Grid Plate Rectifier, D.C. Milliamperes | 0.67 | 0.62 | 0.59 |
| Radio Frequency Voltage, D.C. | | | |
|   Microamperes | 78 | 78 | 78 |
| Mold Flow | Good | V.Good | Good |
| Molding Time Before Pitted Surface, | | | |
|   Sec. | 7 | 13 | 15 |

*Parts by weight
[1] 52/48 Bd/St. + 60 phr oil
[2] Density of 0.92 g/cc, melt index of 70 (ASTM D 1238-65, Condition E)
[3] Argus Chemical Corp, Brooklyn, N.Y., Mark(R) 1589B
[4] Molecular Wt. about 540

EXAMPLE V

In order to illustrate the advantages of the use of bentonite clay as a filler as opposed to whiting or calcium carbonate another series of tests was conducted comparing these two materials. Again, the same microwave generator, the same mold and the same general procedure were employed to produce a slab-type molded sheet.

At the outset it was observed that the whiting compositions were quite difficult to mix and had a sticky, very soft composition.

The results of these tests are set forth in Table V below wherein it is apparent that the articles molded from the compositions containing bentonite clay, in essentially the same mesh size as the whiting, were quite flexible whereas those produced with whiting, as an additive, were stiff and boardy. It is also apparent that the minimum heating time required was substantially greater for the compositions containing whiting.

TABLE V

| Compound | 9* | 10* | 11* | 12* |
|---|---|---|---|---|
| Butadiene/Styrene Radial Teleblock (70/30 Bd/St)** | 150 | 150 | 150 | 150 |
| Low Dens. Polyethylene[1] | 100 | 100 | 100 | 100 |
| Silica | 50 | 50 | 50 | 50 |
| Naphthenic Oil | 200 | 200 | 200 | 200 |
| Zinc Stearate | 0.8 | 0.8 | 0.8 | 0.8 |
| Stabilizers | 0.7[2] | 0.7[2] | 0.95[3] | 0.95[3] |
| Gamma-mercaptopropyltri-methoxysilane | — | — | 4 | 4 |
| Polarizing Agents[4] | 8 | 8 | 8 | 8 |
| Bentonite Clay, 325 Mesh | 400 | — | — | 400 |
| Whiting | — | 400 | 400 | — |
|  | 909.5 | 909.5 | 913.75 | 913.75 |
| Mixing Observation | OK | Sticky, V. Soft | Sticky, V. Soft | OK |
| Minimum Heating Time (Seconds) | 12 | 20 | 60 | 35 |
| Melt Flow, 5Kg at 190° C. | 327 | 589 | 610 | 216 |
| Shore A Hardness | 63–66 | 39–45 | 58–62 | 72–75 |
| Other Physical Properties |  | About | Equal |  |
| Molded Products | Flexible | Boardy | Boardy | Flexible |

*All ingredients are in parts by weight.
**Basic copolymers included 50 phr extender oil added during manufacture.
[1] Density of 0.92 g/cc, melt index of 70 (ASTM D 1238-65, Condition E).
[2] 0.3 Zinc dibutyldithiocarbamate 0.5 Nickel dibutyldithiocarbamate
[3] 0.4 Zinc dibutyldithiocarbamate 0.55 Nickel dibutyldithiocarbamate
[4] 4 Triethanolamine 4 Polyethylene glycol of about 540 molecular weight.

EXAMPLE VI

In yet another series of tests, bentonite clay was compared with whiting in lower concentrations under essentially the same conditions as the previous examples.

Again, it is to be observed that the products containing the bentonite clay were highly flexible whereas those produced from the compositions containing whiting were stiff. In addition, it can also be observed that again the minimum heating time for proper molding was substantially greater when utilizing whiting as opposed to bentonite clay.

TABLE VI

| Compound | 13* | 14* | 15* | 16* |
|---|---|---|---|---|
| Butadiene/Styrene Radial Teleblock (60/40 Bd/St) | 100 | 100 | — | — |
| Butadiene/Styrene Radial Teleblock (52/48 Bd/St - 60 phr oil) | — | — | 150 | 150 |
| Alphamethylstyrene Polymer | 60 | 60 | 40 | 40 |
| Silica | 30 | 30 | 30 | 30 |
| Naphthenic Oil | 70 | 70 | 75 | 75 |
| Zinc Stearate | 0.3 | 0.3 | 0.75 | 0.75 |
| Stabilizer[1] | 0.5 | 0.5 | 0.5 | 0.5 |
| Ethylene/Vinylacetate Copolymer[2] | 20 | 20 | 30 | 30 |
| Desiccant[3] | 15 | 15 | 15 | 15 |
| Sensitizers[4] | 3 | 3 | 6.5 | 6.5 |
| Nitrile Rubber[5] | — | — | 8 | 8 |
| Bentonite Clay, 325 Mesh | 45 | — | — | 58 |
| Whiting | — | 45 | 58 | — |
| | 343.8 | 343.8 | 413.75 | 413.75 |
| Mixing Observation | OK | OK | OK | OK |
| Melt Flow, 2160g/190° C. | 48.8 | 102 | 32.8 | 13.9 |
| HF Flow-Molded Tensile Slabs, 10kw Model J Compo-Fit Machine: | | | | |
| Minimum Heating Time | 15" | 30" | 20" | 10" |
| 300% Modulus, psi, 20" | — | — | 160 | 220 |
| Tensile, psi, 20" | — | — | 400 | 460 |
| Elongation, %, 20" | — | — | 660 | 640 |
| Hardness, Shore A, 20" | — | — | 62–71 | 72–79 |
| Molded Products | Flexible | Stiff | Stiff | Flexible |

*Ingredients in phr (based on 100 parts by weight of thermoplastic elastomer).
[1] 0.5 Tris(nonylphenyl)phosphite.
[2] Melting point about 240° F.
[3] 80 Wt. % ground CaO in high flash process oil (Desi Cal, Basic Chemicals, Cleveland, Ohio).
[4] 50/50 by weight triethanolamine and polyethylene glycol of about 540 molecular weight.
[5] Powdered butadiene-acrylonitrile elastomer, 50 Mooney viscosity, ML-4, 210° F., (Hycar 1452 P-5D, B. F. Goodrich Chemical Co., Cleveland, Ohio).

EXAMPLE VII

The effect of substituting carbon black for all or part of the hygroscopic filler was evaluated in the tests set forth in Table VII below:

TABLE VII

| Composition | 17 | 18 | 19 | 20 |
|---|---|---|---|---|
| Butadiene/Styrene Radial Teleblock[1] | 140 | 140 | 140 | 140 |
| Polystyrene | 75 | 75 | 75 | 75 |
| Silica | 45 | — | 45 | 45 |
| Bentonite (350 mesh) | 300 | 300 | 150 | — |
| Carbon Black | — | 45 | 150 | 300 |
| Naphthenic Oil | 250 | 250 | 250 | 250 |
| Zinc Stearate | 5 | 5 | 5 | 5 |
| Ethylene/Vinylacetate[2] | 25 | 25 | 25 | 25 |
| Stabilizers: | | | | |
| Nickel Dibutyldithiocarbamate | 0.5 | 0.5 | 0.5 | 0.5 |
| Zinc Dibutyldithiocarbamate | 0.5 | 0.5 | 0.5 | 0.5 |
| Paraffin Wax | 3 | 3 | 3 | 3 |
| Sensitizers[3] | 16 | 16 | 16 | 16 |
| Dessicant: CaO dispersed in oil | 20 | 20 | 20 | 20 |
| Styrene/Butadiene[4] | 15 | 15 | 15 | 15 |
| | 895 | 895 | 875 | 895 |
| Calculated Specific Gravity | 1.29 | 1.28 | 1.26 | 1.24 |
| HFFM, Time, Secs. | 5 | 2 | 4 | 6 |
| 300% Modulus, psi | 110 | 70 | 140 | — |
| Tensile Strength, psi | 150 | 130 | 140 | 300 |
| % Elongation | 450 | 540 | 300 | 190 |
| Shore A Hardness | 30 | 22 | 42 | 35 |
| Melt Index Flow, 325 grams at 190° C. | 4.6 | 37.4 | 0.65 | 4.4 |
| Mold Flow @ 2", Rating 1-5, 1 is Best | 2 | 2 | 3 | 5 |
| Time for Equivalent Mold Flow, Secs. | 2" | 2" | 8" | 8" |
| Scrub Test on White Paper, Marking | Non- | Non- | Slight | Heavy |
| Oil Bleedout on Brown Paper | | | | |
| After 3 weeks | Slight | Medium | Slight | None |
| After 6 weeks | Medium | Heavy | Medium | Slight |

[1] 60/40 Bd/St + 50 phr oil
[2] Molecular weight about 240
[3] Triethanolamine + Polyethylene glycol (Molecular Wt. about 540) in equal portions
[4] Emulsion polymerized at 41° F. containing 50 parts carbon black per 100 parts rubber It is to be observed from Table VII that, while carbon black has the effect of reducing the bleed out of extender oil, it has a number of disadvantages when compared with bentonite clay. Specifically, when ½ of the bentonite clay was replaced with carbon black the time necessary for molding was increased and the melt flow of the composition was reduced. When the carbon black replaced all of the bentonite clay the tensile, modulus and hardness increased, as did the molding time necessary and mold flow was further reduced. In addition, a molded sheet of the product produced heavy black marks when scrubbed on a light colored surface.

ently does not function in the same manner, in the present process, as does absorbed water.

EXAMPLE VIII

Yet another series of comparative tests was conducted as set forth in Table VIII below:

TABLE VIII

| Composition | 21 | 22 | 23 | 24 | 25 | 26 |
|---|---|---|---|---|---|---|
| Butadiene/Styrene Radical Teleblock[1] | 150 | | | | | |
| Polystyrene | 75 | | SAME | | | |
| Silica | 45 | | | | | |
| Bentonite (350 mesh) | 300 | — | — | — | — | — |
| Bentonite (325 mesh) | — | 300 | — | — | — | — |
| Royal King Clay (Hard China) | — | — | 300 | — | — | — |
| Suprex Clay (Hard China) | — | — | — | 300 | — | — |
| Gamoco Whiting | — | — | — | — | 300 | — |
| Paragon Clay (Soft China) | — | — | — | — | — | 300 |
| Napthenic Oil | 250 | | | | | |
| Zinc Stearate | 5 | | | | | |
| Ethylene Vinylacetate Copolymer[2] | 25 | | | | | |
| Stabilizers: | | | | | | |
| Nickel Dibutyldithiocarbamate | 0.5 | | | | | |
| Zinc Dibutyldithiocarbamate | 0.5 | | SAME | | | |
| Antioxidant[3] | 0.5 | | | | | |
| Paraffin Wax | 3 | | | | | |
| Styrene/Butadiene[4] | 16 | | | | | |
| Dessicant[5] | 20 | | | | | |
| Carbon Black | 5 | | | | | |
| | 895.5 | 895.5 | 895.5 | 895.5 | 895.5 | 895.5 |
| Specific Gravity | 1.29 | 1.29 | 1.29 | 1.29 | 1.29 | 1.29 |
| Mixing Time, Min. | 10 | 14 | 14 | 12 | — | 18 |
| Mixing, Dumping, Charact. | Good | Good | Poor | Fair | Would Not Mix | Fair |

| Heating Time | Grid Plate Rectifier, Max. | | | | | |
|---|---|---|---|---|---|---|
| Secs. | | | | | | |
| 3 | .54 | .62 | .36 | .38 | — | .36 |
| 6 | .54 | .56 | .36 | .36 | — | .34 |
| 10 | Arc | Arc | — | — | — | — |
| 12 | — | — | .36 | .36 | — | — |
| 15 | — | — | — | — | — | .35 |

| Mold Flow Charact. | | | | | | |
|---|---|---|---|---|---|---|
| Secs. | | | | | | |
| 3 | Good | Good | No Flow | No Flow | — | No Flow |
| 6 | Excellent | Excellent | (Little Flow) | (Little Flow) | — | (Little Flow) |
| 10 | Overheat | Overheat | — | — | — | — |
| 12 | — | — | Fair | Fair | — | — |
| 15 | — | — | — | — | — | Fair |

| Physical Properties | | | | | | |
|---|---|---|---|---|---|---|
| 30% Modulus, psi | 130 | 130 | 190 | 200 | — | 150 |
| Tensile Strengh, psi | 200 | 180 | 200 | 220 | — | 170 |
| Elongation, % | 460 | 490 | 330 | 390 | — | 370 |
| Shore A Hardness | 34 | 39 | 39 | 34 | — | 32 |

[1] 60/40 Bd/St + 50 phr oil
[2] Molecular Weight about 240
[3] Argus Chemical Corp., Brooklyn, N.Y., Mark(R) 1589B
[4] Emulsion polymerized at 41° F. containing 50 parts carbon black per 100 parts rubber
[5] 80 Wt. % CaO in high flash process oil (Desi Cal, Basic Chemicals, Cleveland, Ohio)

Table IX shows the comparative moisture contents of the fillers utilized in the previous comparative examples. While the nonhygroscopic Hi Sil 233 (Silica) and Royal King Clay (Hard China) exhibit high initial water contents, it is obvious from the previous examples that these materials are inferior to the hygroscopic fillers of the present invention, due to the facts that the absorbed water is readily driven off as soon as the temperature is above the boiling point of water, usually in the preparation of the compositions prior to molding, and any chemically-bound water, which is not driven off apparently does not function in the same manner, in the present process, as does absorbed water.

TABLE IX

| Filler | Supplier | % Moisture |
|---|---|---|
| 1. Royal King Clay (Hard China) | H. M. Royal, Inc. | 14.0 |
| 2. Western Bentonite | H. M. Royal, Inc. | 9.0 |
| 3. Hi Sil 233 (Silica) | PPG Industries | 5.3 |
| 4. Philblack N550 (Carbon Black) | Phillips Petroleum | 1.0 Max. |
| 5. Wood Flour | Wood Flour, Inc. | 5.0–8.0 |
| 6. Ground Cork | Dodge Cork Company | 4.0–9.0 |
| 7. Suprex Clay (Hard China) | J. M. Huber | 1.0 Max. |
| 8. Gamaco Whiting | Georgia Marble | 1.0 Max. |
| 9. Paragon Clay (Soft China) | J. M. Huber | 1.0 Max. |

Some of the advantages of the hygroscopic fillers over nonhygroscopic fillers, such as whiting and china clay, etc. can be summarized as follows:

Shorter mixing times.
No stickiness in the mixing chamber or on roll mills.
Shorter heating time in a high frequency field.
More suitable melt flow, i.e., higher than china clay and lower than whiting.
Higher hardness than whiting and about the same as china clay.
Equal or slightly better stress/strain properties but considerably better tear (hand test).
Considerably better flexibility than whiting and especially china clay.

While specific materials, amounts thereof and operating procedures have been referred to herein, numerous variations and modifications thereof will be apparent to one skilled in the art and the present invention is considered to include such variations and modifications.

What is claimed is:

1. An unvulcanized, pressure and heat moldable composition comprising:
   100 parts by weight of a thermoplastic elastomer;
   at least about 10 parts by weight of an extender oil per 100 parts by weight of said thermoplastic elastomer; and
   at least about 20 parts by weight of at least one solid, hygroscopic filler, having greater than 1 percent by weight of absorbed water and being capable of retaining a substantial portion of said absorbed water at a temperature above 100° C. and utilized in the preparation of said composition, per 100 parts by weight of said thermoplastic elastomer;
   the ratio of said extender oil to said hygroscopic filler being from about 0.3 to about 3.

2. A composition in accordance with claim 1 wherein the thermoplastic elastomer is a conjugated diene/vinyl aromatic block copolymer.

3. A composition in accordance with claim 2 wherein the block copolymer is selected from the group consisting of linear block and radial teleblock copolymers.

4. A composition in accordance with claim 3 wherein the copolymer is a radial teleblock copolymer.

5. A composition in accordance with claim 1 wherein the thermoplastic elastomer is a butadiene/styrene block copolymer having a butadiene/styrene weight ratio between about 85/15 to about 45/55.

6. A composition in accordance with claim 1 wherein the composition contains up to about 150 parts by weight of a solid resinous polymer per 100 parts by weight of the thermoplastic elastomer.

7. A composition in accordance with claim 6 wherein the solid resinous polymer is selected from the group consisting of homopolymers of a vinyl-substituted aromatic compound and copolymers of said compound with a copolymerizable compound.

8. A composition in accordance with claim 7 wherein the copolymerizable compound is a compound selected from the group consisting of acrylonitrile and a conjugated diene.

9. A composition in accordance with claim 1 wherein the thermoplastic elastomer is an oil-extended butadiene/styrene block copolymer.

10. A composition in accordance with claim 1 wherein the composition contains a polar agent in an amount sufficient to significantly increase the microwave energy absorptivity of said composition and to render said composition moldable at pressures less than about 200 psi.

11. A composition in accordance with claim 10 wherein the composition contains an ethylene/vinyl acetate copolymer in an amount sufficient to significantly reduce the molding time.

12. A composition in accordance with claim 10 wherein the polar compound is present in an amount sufficient to produce a composition having a molding time between about one second and sixty seconds.

13. A composition in accordance with claim 1 wherein the extender oil is present in an amount between about 250 to about 350 parts by weight per 100 parts by weight of the thermoplastic elastomer, the hygroscopic filler is present in an amount between about 350 to about 500 parts by weight per 100 parts by weight of said thermoplastic elastomer and the oil/filler ratio is between about 0.5 and about 1.0.

14. A composition in accordance with claim 1, 2, 3, 4, 5, 6, 7, 8, 9, 10, 11, 12 or 13 wherein the hygroscopic filler has greater than about 4.0 percent by weight of absorbed water.

15. A composition in accordance with claim 1, 2, 3, 4, 5, 6, 7, 8, 9, 10, 11, 12 or 13 wherein the hygroscopic filler is capable of retaining a substantial portion of the absorbed water at a temperature up to the temperature to be utilized in the molding of said composition.

16. A composition in accordance with claim 1, 2, 3, 4, 5, 6, 7, 8, 9, 10, 11, 12 or 13 wherein the hygroscopic filler is bentonite clay.

17. A composition in accordance with claim 1, 2, 3, 4, 5, 6, 7, 8, 9, 10, 11, 12 or 13 wherein the hygroscopic filler is wood flour.

18. A composition in accordance with claim 1, 2, 3, 4, 5, 6, 7, 8, 9, 10, 11, 12 or 13 wherein the hygroscopic filler is ground cork.

19. A method of flow molding a thermoplastic elastomer composition comprising:
   forming a mixture comprising:
   100 parts by weight of a thermoplastic elastomer;
   at least about 10 parts by weight of an extender oil per 100 parts by weight of the said thermoplastic elastomer; and
   at least about 20 parts by weight of at least one solid, hygroscopic filler, having greater than 1 percent by weight of absorbed water and being capable of retaining a substantial portion of said absorbed water at a temperature above 100° C. and utilized in the preparation of said composition for molding, per 100 parts by weight of said thermoplastic elastomer;
   the ratio of said extender oil to said hygroscopic filler being from about 0.3 to about 3;
   disposing said mixture in a mold;
   exposing said mixture to microwave energy while simultaneously applying pressure below about 200 psi for a period of time sufficient to melt said mixture and cause the same to flow into the interstices of the mold.

20. A method in accordance with claim 19 wherein the thermoplastic copolymer is a conjugated diene/vinyl aromatic block copolymer.

21. A method in accordance with claim 20 wherein the copolymer is selected from the group consisting of linear block and radial teleblock copolymers.

22. A method in accordance with claim 21 wherein the copolymer is a radial teleblock copolymer.

23. A method in accordance with claim 19 wherein the thermoplastic elastomer is a butadiene/styrene block copolymer having a butadiene/styrene weight ratio of about 85/15 to about 45/55.

24. A method in accordance with claim 19 wherein the mixture contains up to about 150 parts by weight of a solid resinous polymer per 100 parts by weight of the thermoplastic elastomer.

25. A method in accordance with claim 24 when the solid resinous polymer is selected from the group consisting of homopolymers of a vinyl-substituted aromatic compound and copolymers of said compound with a copolymerizable compound.

26. A method in accordance with claim 25 wherein the copolymerizable compound is a compound selected from the group consisting of acrylonitrile and a conjugated diene.

27. A method in accordance with claim 19 wherein the thermoplastic elastomer is an oil extended butadiene/styrene block copolymer.

28. A method in accordance with claim 19 wherein the mixture contains ethylene/vinyl acetate copolymer in an amount sufficient to significantly reduce the molding time.

29. A method in accordance with claim 19 wherein the molding time is between about one second and about sixty seconds.

30. A method in accordance with claim 19 wherein the mixture contains about 250 to about 350 parts by weight of extender oil per 100 parts by weight of the thermoplastic elastomer, about 350 to about 500 parts by weight of the hygroscopic filler per 100 parts by weight of said thermoplastic elastomer and the oil/filler ratio is between about 0.5 and about 1.0.

31. A method in accordance with claim 19 wherein the mixture contains a polar compound in an amount sufficient to significantly reduce the molding time.

32. A method in accordance with claim 19, 20, 21, 22, 23, 24, 25, 26, 27, 28, 29, 30 or 31 wherein the hygroscopic filler has greater than about 4.0 percent by weight of absorbed water.

33. A method in accordance with claim 19, 20, 21, 22, 23, 24, 25, 26, 27, 28, 29, 30 or 31 wherein the hygroscopic filler is capable of retaining a substantial portion of the absorbed water at the temperature utilized in the molding.

34. A method in accordance with claim 19, 20, 21, 22, 23, 24, 25, 26, 27, 28, 29, 30 or 31 wherein the hygroscopic filler is bentonite clay.

35. A method in accordance with claim 19, 20, 21, 22, 23, 24, 25, 26, 27, 28, 29, 30 or 31 wherein the hygroscopic filler is wood flour.

36. A method in accordance with claim 19, 20, 21, 22, 23, 24, 25, 26, 27, 28, 29, 30 or 31 wherein the hygroscopic filler is ground cork.

37. A flexible, molded thermoplastic elastomer article comprising:
   100 parts by weight of a thermoplastic elastomer;
   at least about 10 parts by weight of an extended oil per 100 parts by weight of said thermoplastic elastomer;
   and at least 20 parts by weight of at least one solid, hygroscopic filler, having greater than 1 percent by weight of absorbed water and being capable of retaining a substantial portion of said absorbed water at a temperature above 100° C. and utilized in the preparation of said article prior the molding thereof, per 100 parts by weight of said thermoplastic elastomer;
   the ratio of said extender oil to said hygroscopic filler being about 0.3 to about 3.

38. An article in accordance with claim 37 wherein the thermoplastic elastomer is a conjugated diene/vinyl aromatic block copolymer.

39. An article in accordance with claim 38 wherein the copolymer is selected from the group consisting of linear block and radial teleblock copolymers.

40. An article in accordance with claim 39 wherein the copolymer is a radial teleblock copolymer.

41. An article in accordance with claim 37 wherein the thermoplastic elastomer is a butadiene/styrene block copolymer having a butadiene/styrene weight ratio of about 85/15 to about 45/55.

42. An article in accordance with claim 37 wherein the article contains up to about 150 parts by weight of a solid resinous polymer per 100 parts by weight of the thermoplastic elastomer.

43. An article in accordance with claim 42 wherein the solid resinous polymer is selected from the group consisting of a homopolymer of vinyl-substituted aromatic compound and copolymers of said compound with a copolymerizable compound.

44. An article in accordance with claim 43 wherein the copolymerizable compound is a compound selected from the group consisting of acrylonitrile and a conjugated diene.

45. An article in accordance with claim 37 wherein the thermoplastic elastomer is an oil extended butadiene/styrene block copolymer.

46. An article in accordance with claim 37 which additionally includes a polar agent in an amount sufficient to significantly increase the microwave energy absorptivity of the article and render the article moldable at a pressure less than about 200 psi and said article is flow molded by exposure to microwave energy.

47. An article in accordance with claim 46 wherein the article contains an ethylene/vinyl acetate copolymer in an amount sufficient to significantly reduce the time required for molding of the same.

48. An article in accordance with claim 46 wherein the article is molded in a time between about one second and about sixty seconds.

49. An article in accordance with claim 37 wherein the oil is present in amounts of about 250 to 350 parts by weight per 100 parts by weight of the thermoplastic elastomer, the hygroscopic filler is present in amounts of about 350 to about 500 parts by weight per 100 parts by weight of said thermoplastic elastomer and the oil/filler ratio is between about 0.5 and about 1.0.

50. An article in accordance with claim 37 wherein the article comprises a fabric substrate bonded to the elastomer.

51. An article in accordance with claim 50 wherein the fabric substrate is a carpeting.

52. An article in accordance with claim 37, 38, 39, 40, 41, 42, 43, 44, 45, 46, 47, 48, 49, 50 or 51 wherein the hygroscopic filler has greater than about 4.0 percent by weight of absorbed water.

53. An article in accordance with claim 37, 38, 39, 40, 41, 42, 43, 44, 45, 46, 47, 48, 49, 50 or 51 wherein the hygroscopic filler is capable of retaining a substantial portion of the absorbed water at the temperature at which said article was molded.

54. An article in accordance with claim 37, 38, 39, 40, 41, 42, 43, 44, 45, 46, 47, 48, 49, 50 or 51 wherein the hygroscopic filler is bentonite clay.

55. An article in accordance with claim 37, 38, 39, 40, 41, 42, 43, 44, 45, 46, 47, 48, 49, 50 or 51 wherein the hygroscopic filler is wood flour.

56. An article in accordance with claim 37, 38, 39, 40, 41, 42, 43, 44, 45, 46, 47, 48, 49, 50 or 51 wherein the hygroscopic filler is ground cork.

* * * * *

UNITED STATES PATENT AND TRADEMARK OFFICE
CERTIFICATE OF CORRECTION

PATENT NO. : 4,234,636

DATED : November 18, 1980

INVENTOR(S) : Agmund K. Thorsrud et al

It is certified that error appears in the above-identified patent and that said Letters Patent are hereby corrected as shown below:

Column 19, claim 37, line 57, after "an" and before "oil" change "extended" to --- extender ---.

Signed and Sealed this

Seventeenth Day of March 1981

[SEAL]

Attest:

RENE D. TEGTMEYER

Attesting Officer     Acting Commissioner of Patents and Trademarks